United States Patent [19]

Schuster

[11] Patent Number: 4,711,332
[45] Date of Patent: Dec. 8, 1987

[54] DRIVE CONNECTION WITH A FREEWHEEL MECHANISM

[75] Inventor: Max Schuster, Passau, Fed. Rep. of Germany

[73] Assignee: Zahnradfabrik Friedrichshafen AG, Friedrichshafen, Fed. Rep. of Germany

[21] Appl. No.: 866,566

[22] Filed: May 22, 1986

[30] Foreign Application Priority Data

May 23, 1985 [WO] PCT Int'l Appl. ............... PCT/EP85/00246

[51] Int. Cl.$^4$ ............................................. F16D 41/10
[52] U.S. Cl. .................................. 192/48.92; 192/44; 192/36
[58] Field of Search ................. 192/36, 44, 35, 48.92

[56] References Cited

U.S. PATENT DOCUMENTS

| | | | |
|---|---|---|---|
| 2,989,160 | 6/1961 | Woodruff | 192/44 X |
| 3,305,057 | 2/1967 | McAlpin et al. | 192/44 X |
| 4,185,723 | 1/1980 | Kelbel | 192/36 |
| 4,368,808 | 1/1983 | Teraoka | 192/36 |

FOREIGN PATENT DOCUMENTS

| | | |
|---|---|---|
| 892275 | 10/1953 | Fed. Rep. of Germany . |
| 1077537 | 3/1960 | Fed. Rep. of Germany . |
| 1135719 | 8/1962 | Fed. Rep. of Germany . |
| 1575866 | 1/1970 | Fed. Rep. of Germany . |
| 1934131 | 2/1970 | Fed. Rep. of Germany . |
| 2512431 | 9/1976 | Fed. Rep. of Germany . |
| 271338 | 5/1927 | United Kingdom ............. 192/44 |

OTHER PUBLICATIONS

Torsen Concept (T.M.) Literature (3 pages).

Primary Examiner—Carl D. Friedman
Assistant Examiner—Richard E. Chilcot, Jr.
Attorney, Agent, or Firm—Hayes, Davis & Soloway

[57] ABSTRACT

These drive connections with freewheel mechanisms, especially provided for advancing and reversing operation of all-wheel vehicles, have at their disposal fully self-acting reversing shift rings (13) depending exclusively on the respective direction of rotation of the shafts (1, 2) serving as sensors of direction of rotation (22) after the reversal operation there are provided locking elements that become entirely free from torque transmission and have controlling forces dependent on direction of rotation (helical toothing, tiltable ratchets, detent balls, etc.) on a shift ring (13) which is movable by the sensor of direction of rotation (22). Longitudinal or rotational displacements of the shift ring (13) as result of dragging by the sensor of direction of rotation (22) upon change in direction of rotation always self-acting come into gear on these coupling toothings (13, 14, 29) mounted on the output side with countertoothings (12, 31, 45) of toothing bodies (30) non-rotationally held on the output shaft (2) in a manner such that each time only the freewheel direction of rotation corresponding to the torque direction if locked.

Said clutch toothings (13, 14, 29, and 12, 31, 45) in addition can be optionally kept open by means of a servo actuator cylinder (43/48) for operations such as braking where any freewheel action must be switched off in order, for instance, to allow every time the brake torques of all axles also fully to retroact reliably on the engine.

3 Claims, 17 Drawing Figures

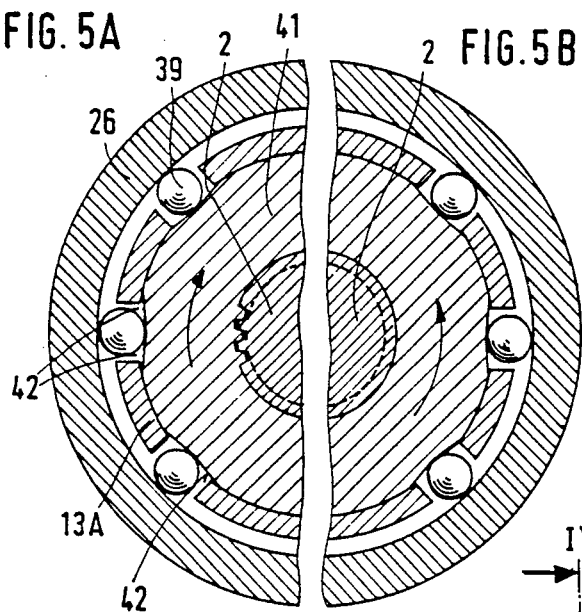
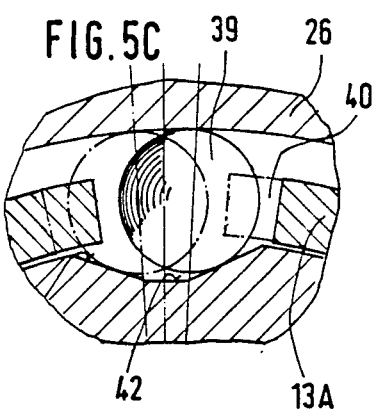
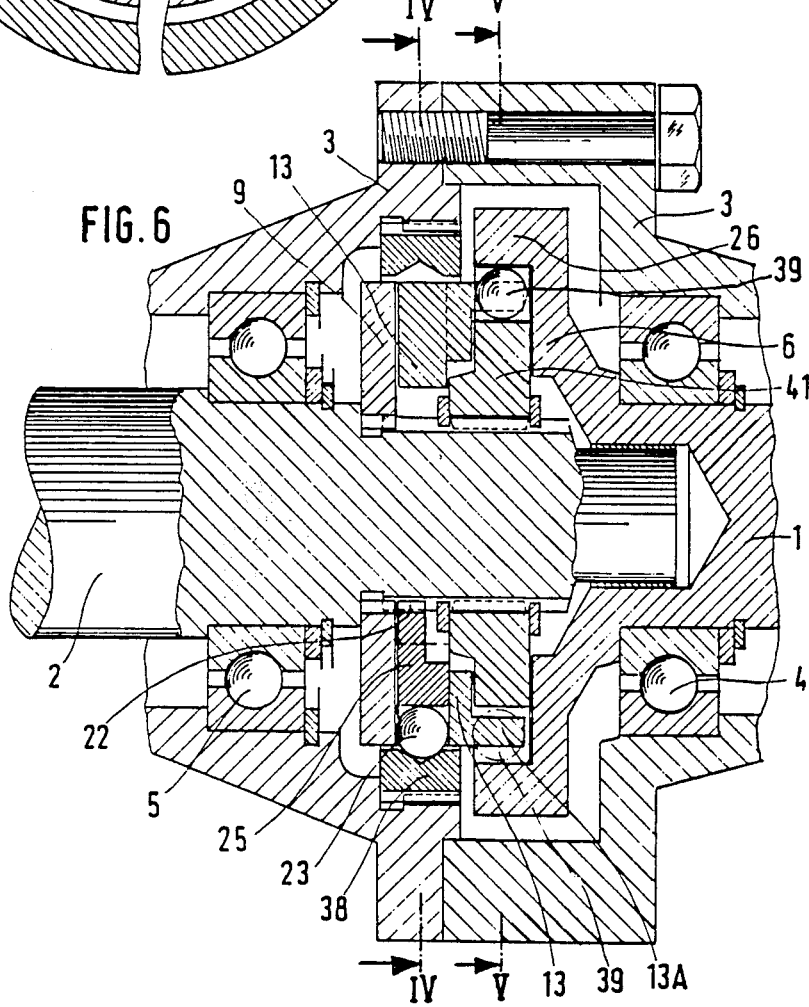

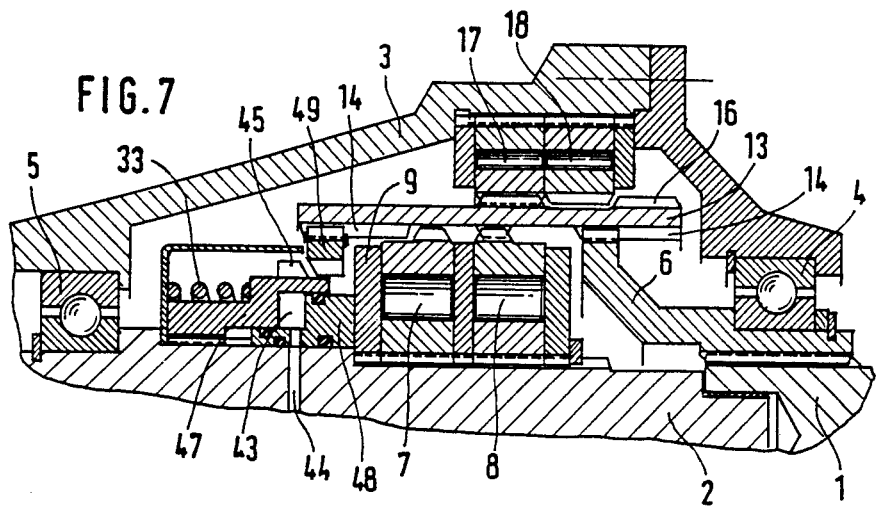
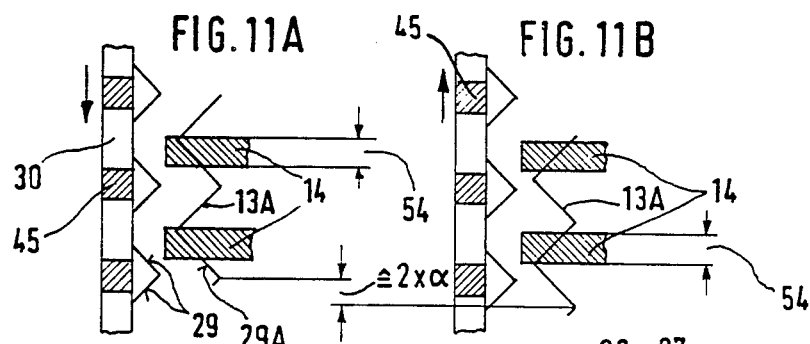
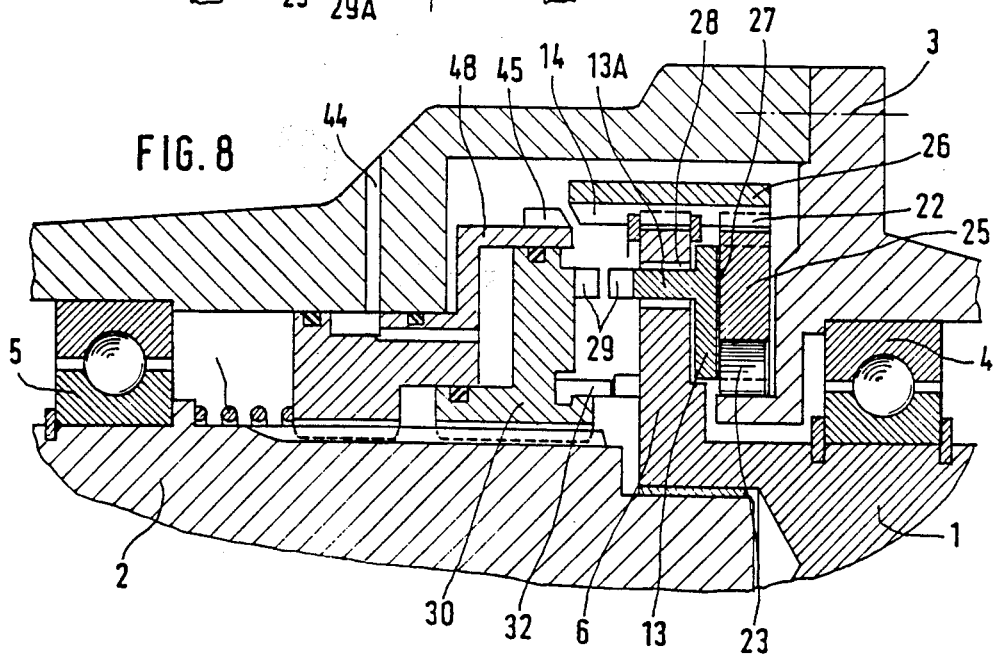

DRIVE CONNECTION WITH A FREEWHEEL MECHANISM

The invention concerns a drive connection with a free wheel mechanism such as known, for instance, from West German Pat. No. 892,275. Those drive connections are especially needed for vehicles having multiple-axle drives in order to make it possible to differ the direction of rotation of the respective drive and output shafts such as, for instance, when braking, turning, etc. and in reversing, while avoiding dangerous drive distortions. According to the cited prior art, the direction of rotation concerned was monitored by means of a friction disk fastened on one of the roller cages of a duplex roller clutch and passed with frictional engagement to the other end of the housing. Depending on the direction of rotation it was thereby possible to lock one or the other of two freewheels in opposite direction. Thus a perfectly self-acting changeover, for instance, from a two-wheel to a four-wheel drive and vice versa could be obtained for both travel directions.

Disadvantageous were, of course, the permanent frictional connnection of the shift ring with the stationary housing and the dependence of the responsiveness on the clamping and respective friction coefficients of the friction disk, which after some time, due to sliding and wearing effects, changed in a manner such that its function as sensor of the direction of rotation was impaired. The permanent frictional connection also hindered efficiency.

The problem to be solved by the invention is to improve the above prior art in the sense of reduced friction, more reliable operation and higher loading capacity.

The solution has been obtained by the fact that frictional connection and transmission of controlling force to the shift ring have been limited only to the duration of the change in direction of rotation, and support against the housing has accordingly been limited to rolling bodies that become gripless in their final positions. Instead of a permanently compressed friction disk, the changeover or pull impulse for the shift ring now comes from the rolling bodies alone reinforcedly pressed on their supporting track only at the moment of change of direction, essentially as a result of inertia, and which in the remaining time are guided with play and thus can roll away almost without friction.

The following objects are obtained by the present invention.

It is obtained that commercially available freewheels need to be combined only with a helical toothing engagement to relay the controlling force to a longitudinally movable shift ring.

It is obtained that in a very compact arrangement a changeover of the shift ring is practicable with the aid of simple shift pawls inserted therein and unstably tiltably guided.

It is obtained that for releasing the frictional connection after changeovers it is possible to use centrifugal forces which keep the sensors of direction of rotation (such as roller bodies and detent balls or the like) in normal operation reliably out of gear in relation to the interior cartridge-case shoulder firm on the housing and free of friction.

It is obtained that when several shift pawls are used, all are pivoted at the same time.

It is obtained that instead of, for example, toothings in a ring gear and on each individual shift pawl, only detent balls in the shift pawl and bores in the cartridge-case shoulder of the flange of the drive shaft need be provided.

It is obtained that the pivoting operation of the shift pawls develops with slight expenditure of force and no residual frictional connection remains possible after the final position is reached.

It is obtained that hard strokes of the shift ring are prevented in the final positions concerned.

It is obtained that the self-acting changeover of the drive connection is released by external engagement for certain traveling situations (such as fast driving on streets).

It is obtained that the release of the self-acting changeover is produced by a servo actuataole prevention clutch capable of coping with high torques, for instance, together with the introduction of high speed, and also that it can again be made regressive without requiring another additional manipulation.

Lastly, space saving arrangements of the actuation cylinder arrangement as shown in the application.

The invention is explained in detail here below with reference to diagrammatic drawings.

FIG. 5A to FIG. 5C show another cross-section with the arrangement of clamping balls to limit the movements of the shift ring.

FIG. 6 shows a longitudinal section through the drive connection with the shift ring shoulders supported against the clamping balls according to FIG. 5.

FIG. 7 shows the self-acting, reversible duplex roller clutch according to FIG. 1, aided by a servo-operatable prevention clutch for separately controlling cancellation of the self-acting reversability.

FIG. 8 shows the drive connection according to FIG. 2 likewise with a servo actuatable prevention clutch wherein the actuation cylinder is surrounded by the toothing body on the output shaft.

FIG. 11A to FIG. 11B show in top view the interplay of tne toothings of the shift ring and of the toothing body with the rejection surfaces provided therebetween.

Figure 1:
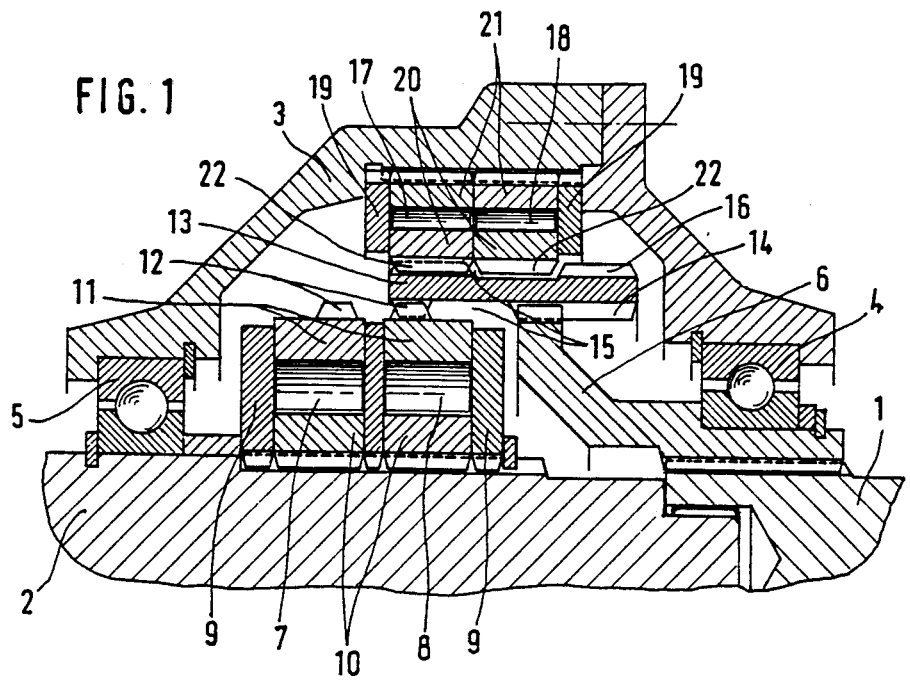
FIG. 1 shows a variant with main freewheels activatable depending on the direction of rotation by a longitudinally movable shift ring as result of impulses from a pair of auxiliary freewheels.

In FIG. 1 the drive connection of the drive shaft 1 and the output shaft 2 concentrically disposed in relation to each other is operated by a duplex roller clutch, which is passed and (in a manner not shown) stationarily held in a housing 3 by means of the bearings 4 and 5 against the shafts 1 and 2. The drive shaft 1 is designed on the output side as flange 6 and upon the output shaft is a main freewheel for the advancing torque 7 and a main freewheel for the reversing torque 8, which are locked together in longitudinal direction between axial bearing surfaces 9. Their inside rings 10 are non-rotationally retained on the drive shaft 2, for instance, via conical toothing and their outside rings 11 are respectively provided with outside toothings 12. One of said toothings 12 can respectively be thrown into gear with the shift ring 13 via an inner straight toothing 14 thereof, which is also geared with an outside toothing of the flange 6 of the drive shaft 1, according to the longitudinal movement of the shift ring 13 over the flange 6. By adequately large and adequately situated gaps 15 in the toothings of the shift ring 14, 16, it is obtained that the latter interacts each time with only one of the freewheels. The controlling force for longitudinal displacement of the shift ring 13 is here produced from the axial force components of a helical toothing 16 either with the auxiliary freewheel for locking during left turn 17 or with the auxiliary freewheel for locking during right turn 18, which are themselves axially firmly held in the housing 3 by the axial bearing surfaces 19. Their respective inside ring 20 rests here on the outer side of the shift ring 13 while their respective outside ring 21 is non-rotationally held in the housing 3. Here the helical toothing of the inside ring of the respectively locked auxiliary freewheel 17 or 18 together with the helical toothing 16 on the outer side of the shift ring 13 act as sensor of the direction of rotation 22.

Whereas in the design of FIG. 1 the different rolling bodies of the alternately interacting freewheels assume the friction-poor support of the sensor of direction of rotation 22, which consists here of the helical toothing, and due to the arrangement of pairs of the freewheels relatively large total length is needed. The design of FIG. 2, constitutes a variant of the drive connection according to the invention in which fewer elements and shorter total length are sufficient. The rolling bodies 23, which go into frictional connection only during the reversing operation, are here supported in an inner cartridge-case shoulder 24 of the housing 3. Upon each one of said rolling bodies 23 there is unstably tiltably mounted a shift pawl 25, which has at its upper edge as speed sensor 22 a stop or a segment toothing or the like which allows limited pivotal movements with the flange 6 or a ring gear 26 supported thereby. The shift pawls 25 are tiltably movably inserted in axial recesses 27 of the shift ring 13 which is here pivotally situated about the shafts 1, 2. With several shift fingers uniformly distributed on the periphery which penetrate on the output side axially through openings 28 in the flange 6 of the drive shaft 1 and carry on the front side rejection surfaces 29, the shift ring 13 grasps forth in the direction of a toothing body 30 non-rotationally held on the output shaft 2, but, for instance, longitudinally movable in a conical toothing. At the head of the toothing body 30 there is a claw toothing 31 capable of being thrown into gear with the toothing of the ring gear 26 and on its front side on the drive side there are rejection surfaces 29 opposite to shift fingers of the shift ring 13 and an orientation guide bar bracket 32 of a kind known per se interacting with counterparts on the flange 6 of the drive shaft 1. In axial direction a compression spring 33 lightly cushions the toothing body 30 against the flange 6 of the drive shaft 1 or the orientation guide bar bracket 32 except when due to a reversal in direction of rotation the shift pawls 25 cause the shift ring 13 to rotate so far in one of its two final positions in the openings 28 of the flange 6 that the rejection surfaces 29A and the opposite rejection surfaces 29B after a corresponding slipping through of the bearing surfaces of the orientation guide bar bracket 32 are in such a reciprocal position that the claw toothing 31 can also slip into the clutch toothing 14 on the ring gear 26.

Figure 3:
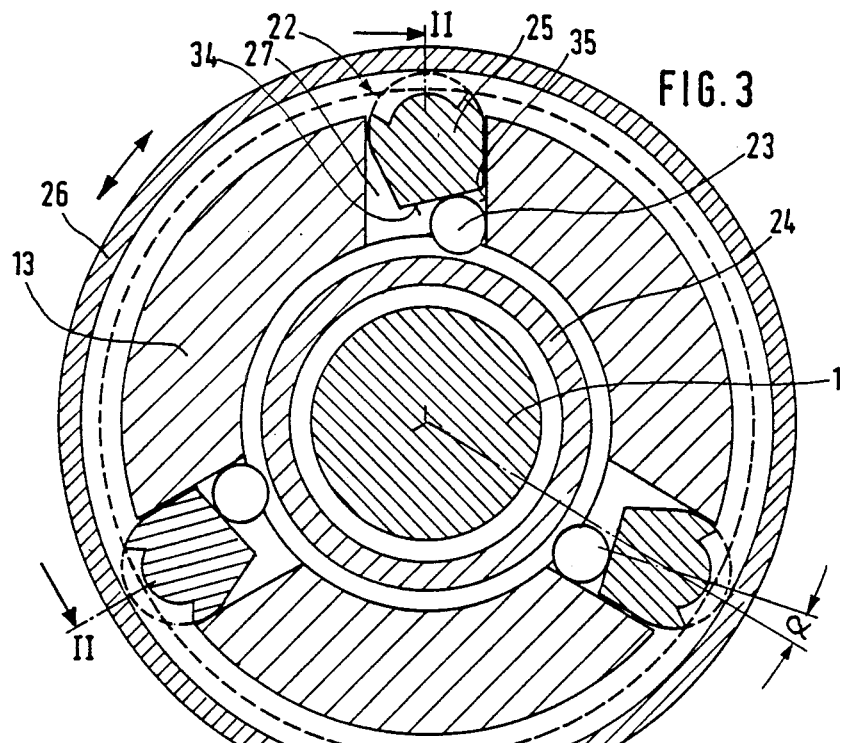
FIG. 3 shows a cross-section through the drive-connection with a blocking detent of the shift pawls belonging to the ring gear-like flange protrusion of the drive shaft which externally embraces the shift ring and interior support by rolling bodies on a cartridge case shoulder fixed to a housing.

In FIG. 3 the arrangement of the shift pawls 25 in the shift ring 13 or the axial recesses 27 cut therein is still further clarified. Here the rolling bodies 23 are easily lifted, due to the torsional pull of the shift ring 13 and to centrifugal forces and corresponding free space below the shift pawl 25, by the cartridge-case shoulder 24 non-rotational with the housing 3; and the rolling surface 34 on the shift pawl 25, under tilting movement thereof, is brought to abut upon the same inside wall 35 of the recess 27. If a reversal in direction of rotation occurs during which the ring gear 26 starts to rotate clockwise with the drive shaft flange 6, then the torsional pull on the respective sensor of direction of rotation 22, in this case of the toothing with the ring gear 26 and the shift pawl 25, produces a pivotal movement of the latter while the shift ring 13 rotates also clockwise so that the roll body 23, with increasingly opening angle of the rolling surface 34 in relation to the cartridge-case shoulder 24, begins to creep on what in the figure is the left side wall 35 of the recess 27 and then in like manner begins to abut there once again. The dimensions and angular positions of the shift pawl 25 or of the recesses 27 are such that the shift ring 13 can complete an angle each time starting from its middle position.

Figures 3A, 4A, 4B, 4C:
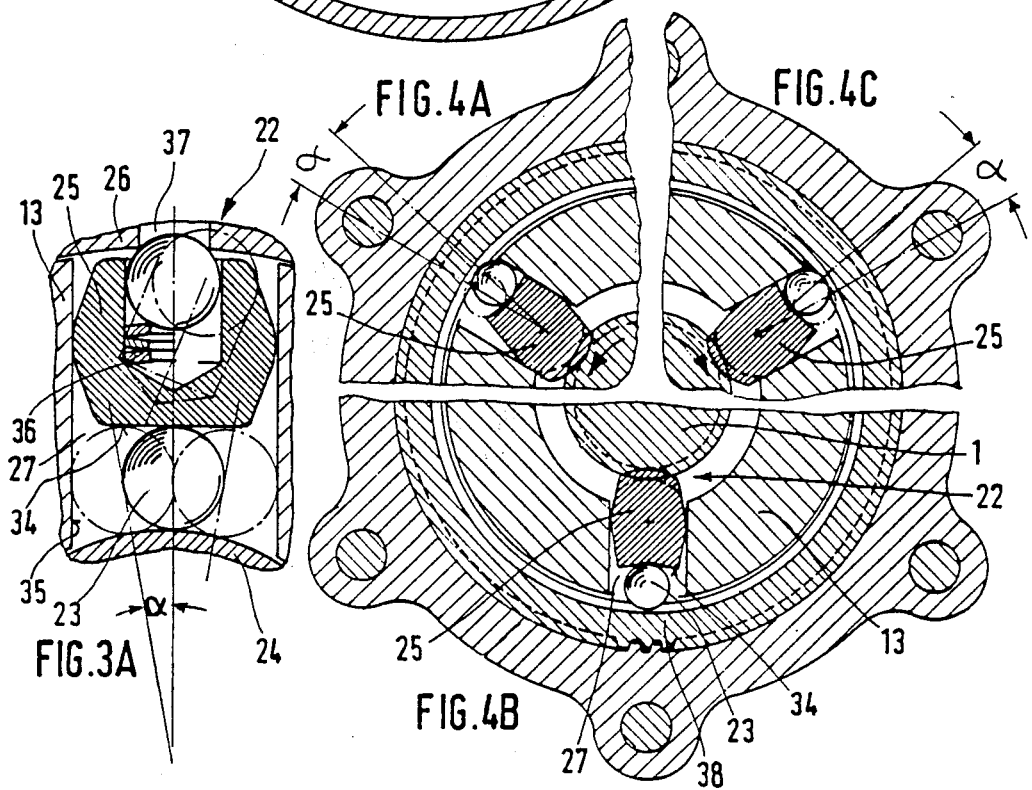
FIG. 3A shows a design detail with detent balls supported by separate springs instead of toothing engagement for the shift pawls.
FIG. 4A to FIG. 4C shows a cross-section through the drive connection with a locking detent of the shift pawls to a shoulder of the drive shaft situated in the center in the two final positions and a central position for the case of equal orientation of the direction of rotation and speed.

In FIG. 3A is illustrated another possible design for the sensor of direction of rotation 22, which is shaped there as a detent ball inserted in the interior of a shift pawl 25 with support against a click-stop spring 36. Instead of a detent combination of the sensor of direction of rotation 22 with an inner toothing of the ring gear 26, this now requires only that there be bores over the middle position of the shift pawls 25.

In FIG. 4A to FIG. 4C is shown, likewise in cross-section, a design of the drive connection, which, although similar in principle to the one according to FIG. 3, nevertheless differs from the illustration already explained by the fact that the rolling bodies 23 in this type of construction rest with limited mobility in an outer supporting ring 38 non-rotational with the housing 3, while a head toothing of the shift pawls 25 that acts as sensor of angle of rotation 22 is in gear with the drive shaft 1 passed through the center of the shift ring 13 in a manner such that the shift pawl 25, depending on the direction of rotation of the drive shaft 1, is pivoted about an angle α either to the left or to the right inside wall 35 of the shift ring 13 with limited torsional pull thereof, the shift ring 13 being then, upon left rotation in line of vision, pivoted about an angle α by means of the shift pawl 25 and the roll body 23 and locked in the position shown in FIG. 4A. If a change in direction of rotation occurs, the shift pawl 25 or the shift body 23 passes first the neutral middle position shown in FIG. 4B and remains then in the final position shown in FIG. 4C for drive shafts 1 that rotate to the right. In this embodiment relative movements of the parts of the sensor of direction of rotation 22 in relation to the ring 38 can result even when no clear reversal of direction takes place.

In FIG. 5A to FIG. 5C is illustrated now the shift fingers 13A, which from the shift ring 13 axially mesh between the freewheel rolling bodies 39 leaving a certain circumferential free space 40, concentrically surround a freewheel body 41 fixed on the output shaft 2. Below the freewheel rolling bodies 39 guided into the circumferential free spaces that have been radially left open by the shift fingers 13A, there have been incorporated in the freewheel body 41 bilaterally faceted ratchet brakes 42. In FIG. 5B is shown the same arrangement as in FIG. 5A, but for opposite direction of rotation. In the partial section FIG. 5C is shown enlarged the support of a freewheel roll body 39 between the ratchet brake 42 and the ring gear 26 in both final positions after corresponding adjustment of the shift ring 13A. It must be understood that the shift fingers 13A can also, like a basket, surround the freewheel roll body 39.

In FIG. 6 is shown in longitudinal section still another example of a duplex roller 39/41 disposed with a freewheel according to FIG. 5A to FIG. 5C. There is here directly integrally formed on the drive shaft 1 or the flange 6 thereof a ring gear 26 without toothing, which simultaneously constitutes the outside ring of the duplex roller formed by freewheel rolling bodies 39 and a freewheel body 41 fixed on the output shaft 2. Said duplex roller, as already explained in the preceding paragraph concerning FIG. 5A, is self-actuatably lockable in one or the other direction by means of the shift fingers 13A which from the shift ring 13 project axially between the free-wheel rolling bodies 39 due to a small relative rotation of the shift ring 13 in relation to the freewheel body 41. The controlling forces are here obtained and further transmitted through the shift pawls 25 in the above described manner. The changeover from one to the other direction of rotation is effected with only minimal frictional losses, since the sensors of direction of rotation 22 designed as shift pawls 25 are to be regarded as gears supported on the rolling bodies 23, which gears are exposed to almost no wear even with a frequent change in direction of rotation.

In FIG. 7 is again illustrated the construction already discussed in FIG. 1 with a shift ring 13 movable through a helical toothing 16, but amplified in the sense that due to a servo actuation cylinder 43 which is chargeable via pipes 44 provided in the output shaft 2, it can throw out of gear a coupling toothing 45 against the pressure of a spring 33 in relation to the straight toothing 14 of the shift ring 13 independent of the respective direction of rotation or free wheel locked position. For this purpose the servo actuator's jacket 47 is non-rotationally but longitudinally movable on the output shaft 2 in relation to a piston 48 likewise fastened on the output shaft 2 to an extent such that the coupling toothing 45 can be axially pushed out in relation to the straight toothing 14 or an intermediate web 49 inserted therein when the duplex roller ⅞ should be able to stop automatically in both directions of rotation. When the pressurized fluid is turned off, the spring 33 again automatically produces the anti-twist connection of the shift ring 13 or of flange 6 of the drive shaft 1 that supports it with the output shaft 2 via the intermediate web 49 and the coupling toothing 45 of the servo actuator's jacket 47 so that thereby both halves or directions of rotation of the duplex roller 7, 8 are rigidly bridged.

Figure 2:
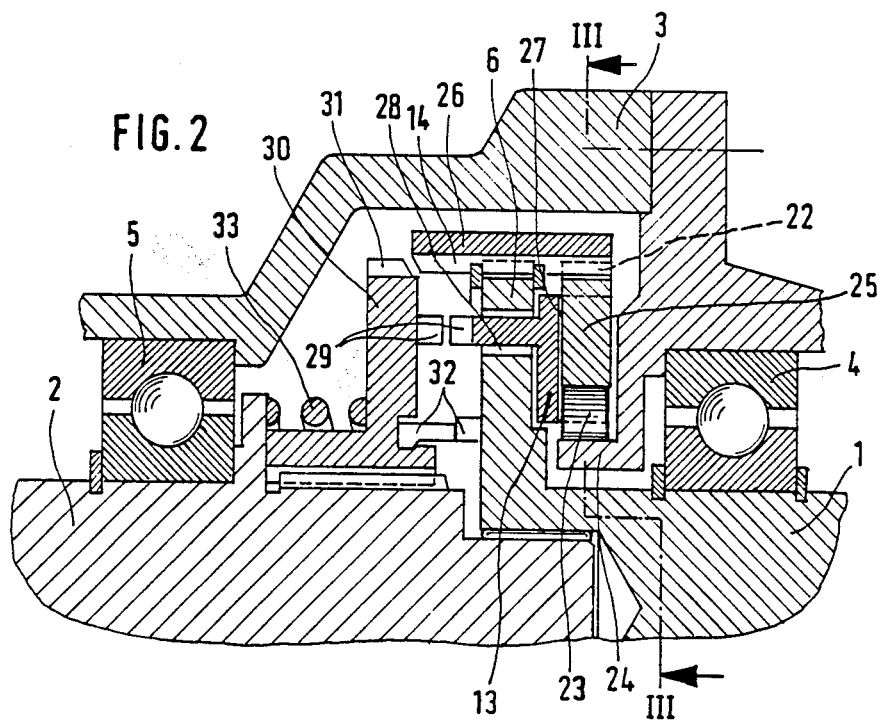
FIG. 2 shows a shift freewheel by the shift pawls of which make the shift ring pivotable, so that it allows a toothing body of the output shaft to either engage in or disengage from a ring gear toothing.

In FIG. 8 is an obviously similar bridging, but provided for the shift free-wheel structure of FIG. 2. According to this, it is possible to situate before the toothing body 30 a piston 48 which with its rear wall on the output side forms a servo actuation cylinder 43 axially with a spring 33 that axially supports said piston 48 opposite the drive shaft 2. The spring seeks to throw into gear, by axial movement alone, the coupling toothing 45 provided on the piston together with the toothing body 30, via the rejection surfaces 29 and the orientation guide bar bracket 32, with the inner straight toothing of the ring gear 26 on the flange 6 of the drive shaft. Since in case of different angles of rotation over the shift ring 13, the rejection surfaces 29 or the orientation guide bar bracket 32 also allow an engagement only in predeterminable overlapping position, a reciprocal ratching of the coupling toothings and likewise hard impulses are prevented here as well.

Figure 9:
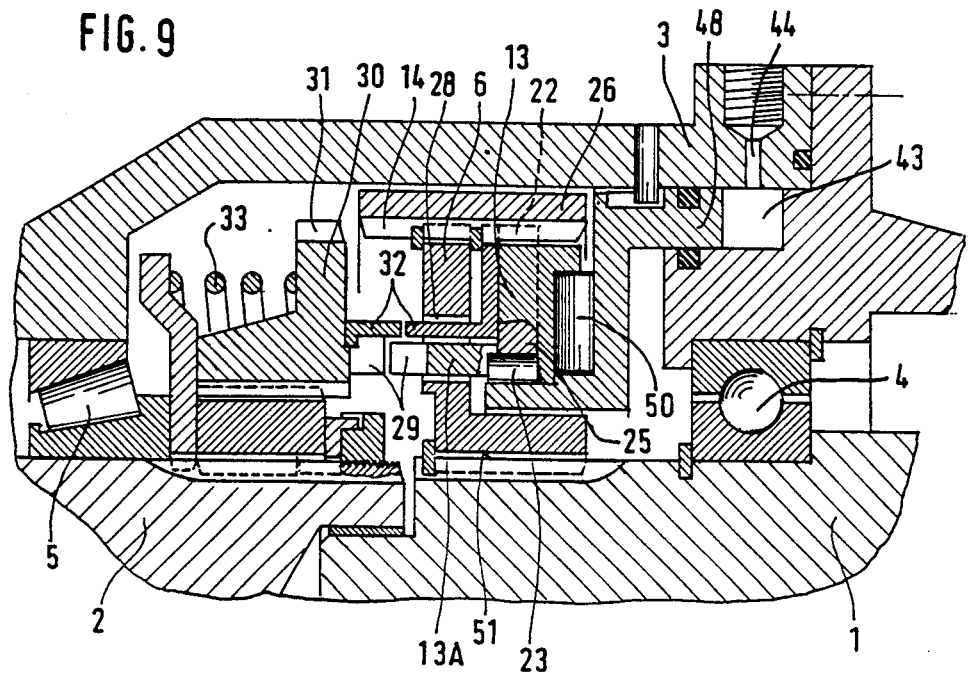
FIG. 9 shows a drive connection with servo actuatable prevention clutch wherein the actuation cylinder is forced into the housing via the bearing of the drive shaft and acts upon the shift ring itself.

In FIG. 9, another especially compact construction variant is illustrated wherein the cylinder 43 is over the bearing 4 on the drive side and the piston 48 is situated on the drive side in the shift ring 13. At the same time, in this variant, the piston 48, non-rotationally passed into the housing 3, abuts by means of an axial support 50 on the drive side against the shift ring 13 and also carries it radially over an axial cartridge-case shoulder 51, integrally formed directly on the piston and upon which are also quite unstably guided the rolling bodies 23 in the manner shown for instance in FIG. 3. The shift fingers 13A that project from the shift ring 13 on the output side are provided in a manner known already with rejection surfaces 29 or interact with corresponding counterfaces on the toothing body 30 non-rotationally out longitudinally movably guided on the output shaft 2. Said toothing body 30 is here also axially supported again by a spring 33 on the output shaft 2. Its coupling toothing 31 is inserted through the spring 33 after the usual tooth overlap operation by means of the rejection surfaces 29 into the inside toothing 14 of the ring gear 26 situated with limited longitudinal mobility in relation to the drive shaft 1 by means of the flange 6. Here, an orientation guide bar bracket arrangement 32 (situated above the rejection surfaces 29), which has opposite the shift pawls 25 a support ring of limited rotational mobility with gaps for counterteeth which rotatably abut upon the toothing body 30 can be of help. If the pressure in the cylinder 43 is lowered, the spring 33 is no longer capable of holding the coupling toothing 31 in gear since then the piston 48 allows the shift ring 13 or the flange 6 to glide back somewhat in the direction of the drive shaft 1. Thus, it becomes possible again automatically to shift the double shirt freewheel.

Figure 10:
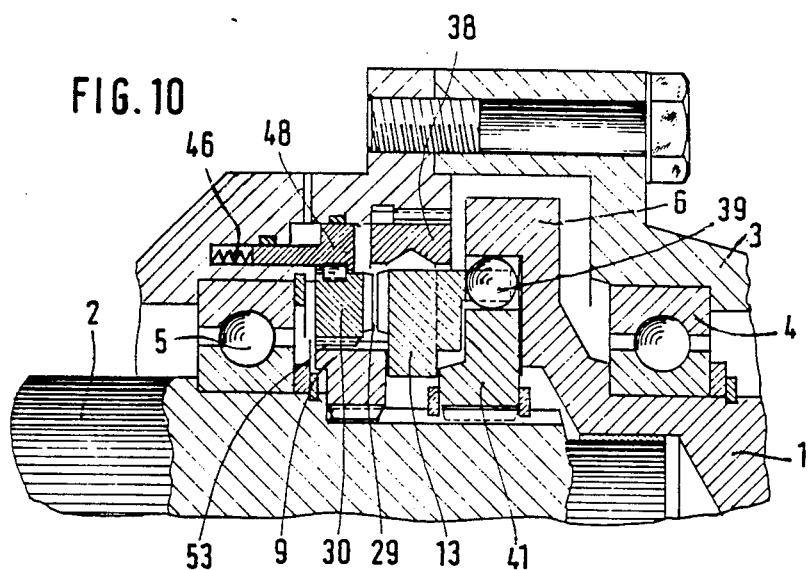
FIG. 10 shows a drive connection with servo actuatable prevention clutch wherein the actuation cylinder is situated above the toothing body.

In FIG. 10 is again illustrated an arrangement corresponding to FIG. 6 but further combined with a servo actuated bridging clutch, the cylinder of which can be provided over the bearing 5 of the output shaft 2. The locking of the freewheel action is obtained here by engaging the coupling toothing 45/14 already known from the foregoing with the rejection surfaces 29 provided between the shift ring 13 secured with longitudinal rigidity and the longitudinally movable toothing body 30. The toothing body 30 is movable on the periphery in longitudinal direction by the piston 48 over a few rolling bodies 52 axially held therein. A traction spring 46 anchored in the housing 3 can again throw and maintain out of gear the piston 48 when the pressure diminishes in the cylinder 43. In order to keep the longitudinally movable toothing body 30 as narrow as possible, its slip change toothing 53 is here mounted on an axial bearing surface 9 above the output shaft.

In FIGS. 11A and 11B is illustrated a design variant for the coupling toothings 45/14 or 29 respectively in their final positions for rotation to the left or to the right. The coordination of rejection surfaces 29 with the coupling toothing 45 is made herein in a manner such that the gaps between each two teeth of the inside toothing 14 of tne ring gear 26 precisely suffice to allow the rejection surfaces 29 concentrically arranged before the coupling teeth 45 on the toothing body 30 to mesh in the toothing gaps both at the left and at the right final position of the shift ring 13 or the shift fingers 13A thereof provided with larger rejection surfaces 29A. The tooth width 54 of the ring gear toothing 14 is here smaller than the twofold curvature coefficient (twice $\alpha$), which the shift ring 13 can define on the way from one final position to the other as a result of the tilting movement of the shift ratchet pawl 25. The disconnection of the freewheel function by means of the servo actuation cyliner 43 can have the purpose, for instance, of conducting retarding torques of the engine or other drive axles even when the direction of rotation concerned would on its own work in the freewheel. This operation can be controlled, for instance, by engine oil pressure or brake pedal pressure. It is advantageous here that the shift ratchet pawl 25 or the rolling bodies 23 themselves not transmit momentum even partially. If a corresponding oil pressure control has been provided, the double shift freewheel can be reversed completely without load upon reaching a zero speed. The normal operation of the double shift freewheel according to the invention can be produced again automatically immediately after terminating a braking operation.

Reference Numerals

1—drive shaft
2—output shaft
3—housing
4—bearing of 1
5—bearing of 2
6—flange of 1
7—main free wheel for advancing torque
8—main free wheel for reversing torque
9—axial bearing surface for 7 or 8
10—inside ring of 7 or 8
1113 outside ring of 7 or 8
12—outside toothing of 7 or 8
13—shift ring, displaceable or pivotable
13A—A shifting finger
14—straight toothing inside of 13
15—gaps of toothings 13, 14
16—helical toothing outside of 13
17—auxiliary freewheel for lockings during left turns
18—auxiliary freewheel for lockings during right turns
19—axial bearing surface for 17 or 18
20—inside ring of 17 or 16
21—outside ring of 17 or 16
22—22 sensor for direction of rotation (click-stop device)
23—roll body
24—cartridge-case shoulder of 3
25—shift pawl
26—ring gear upon 6
27—recess in 13
28—opening in 6
29—rejection surface
30—toothing body
31—claw toothing
32—orientation guide bar bracket
33—compression spring
34—rolling surface of rolling bodies
35—inside wall
36—click-stop spring
37—hole in 26
38—supporting ring in 3
39—freewheel roll body
40—circumferential free space
41—freewheel body
42—ratchet brake
43—servo actuation cylinder
44—conduit
45—coupling toothing for 48
46——
47—servoactuator's jacket
48—piston of 43
49—intermediate web
50—cartridge-case shoulder of 48
51—roll body for 30
52—slip change toothing upon 9

I claim:

1. A drive connection for a drive and a driven coaxial shafts having a freewheel means therebetween which is lockable in a direction of rotation and allows the driven shaft to rotate faster than the drive shaft in said direction of rotation, said drive shaft includes a flange which pivotally supports a shift ring (13), said freewheel means is self-actuatably reversible by means of said shift ring (13) when said direction is reversed, and said shift ring (13), with the aid of a sensor of direction of rotation (22) supported on a non-rotational housing (3), can be brought from a first position in one direction of rotation to a second position in the opposite direction of rotation and vice versa, characterized in that said sensor of direction of rotation (22) is a shift element which is retained against said housing (3) in frictional engagement only during reversing operation of said direction of rotation and is maintained out of frictional engagement with said housing (3) after the reversing operation has occurred.

2. A drive connection according to claim 1, characterized in that the sensor of direction of rotation (22) is at least one shift pawl (25), tiltably supported on a rolling body (23), provided in each axial recess (27) of said shift ring (13) between a cartridge-case shoulder (24) of said housing (3) and a ring gear (26) carried by the flange of said drive shaft (1), the shift ring is pivotable by said shift pawls (25) about a limited traverse angle of (2$\alpha$) in relation to the center of said shafts (1,2) into one of two stable positions via inside walls (35) of said recess (27) such that rejection surfaces (29), carried by the shift ring (13) and protruding on the driven side of the flange, engage with mating rejection surfaces on said toothing body (30) and allow claw toothing (14) of the ring gear (26) to positively engage with a respective toothing (31) on the toothing body (30) as said toothing body (30) moves axially in a direction of the shift ring (13) via spring (33), and said mating rejection surfaces become disengaged upon freewheeling thereby forcing toothing body (30) axially away from shift ring (13) and interupting the positive drive.

3. A drive connection according to claim 2, characterized in that each said shift pawl (25) is the sensor of direction of rotation (22) and each one can be brought to abut against one of said inside walls (35) of said recess (27) upon a change in direction, wherein said rolling bodies (23), after termination of the shift pawl (25) tilt, are no longer frictionally engaged with shoulder (24) of said housing (3) because of centrifugal force.

* * * * *